(12) United States Patent
Yamashita et al.

(10) Patent No.: US 10,199,786 B2
(45) Date of Patent: Feb. 5, 2019

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Rodrigo Kendy Yamashita, Tokyo (JP); Hirofumi Utsunomiya, Tokyo (JP); Masatoshi Ushiyama, Tokyo (JP); Tomoki Kawamura, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 0 days.

(21) Appl. No.: 16/028,551

(22) Filed: Jul. 6, 2018

(65) Prior Publication Data

US 2018/0316149 A1 Nov. 1, 2018

Related U.S. Application Data

(63) Continuation of application No. PCT/JP2017/000250, filed on Jan. 6, 2017.

(30) Foreign Application Priority Data

Jan. 8, 2016 (JP) ................................ 2016-002910

(51) Int. Cl.
*H01R 39/00* (2006.01)
*H01R 35/02* (2006.01)
(Continued)

(52) U.S. Cl.
CPC ........... *H01R 35/02* (2013.01); *B60R 16/027* (2013.01); *H01R 35/04* (2013.01); *H01R 2201/26* (2013.01)

(58) Field of Classification Search
None
See application file for complete search history.

(56) References Cited

U.S. PATENT DOCUMENTS

| 8,845,348 B2 | 9/2014 | Yamawaki |
| 8,986,026 B2 * | 3/2015 | Utsunomiya .......... H01R 35/04 439/164 |
| 2014/0051267 A1 | 2/2014 | Asakura et al. |

FOREIGN PATENT DOCUMENTS

| JP | 07-249468 | 9/1995 |
| JP | 08-306457 | 11/1996 |

(Continued)

OTHER PUBLICATIONS

International Search Report dated Apr. 4, 2017 in PCT/JP2017/000250 filed Jan. 6, 2017 (with English Translation).

*Primary Examiner* — Tho D Ta
(74) *Attorney, Agent, or Firm* — Oblon, McClelland, Maier & Neustadt, L.L.P.

(57) ABSTRACT

The present invention provides a rotary connector device that enables relative rotation between the rotator and the stator to be easily and reliably fixed at a neutral position even when a steering device is disengaged. A rotary connector device (1) according to the present invention is provided with: a self-rotation pin (50) that is self-rotatable with respect to a sleeve (30) and that is provided with a pin-side notch (521) that restricts the self-rotation by coming into contact with an inner circumferential surface of a stator-side inner-circumferential cylindrical portion (23); a stationary-side gear (231) and a self-rotation-side gear (511) that transmit the relative rotation and the self-rotation in an interlocked manner; and a stationary-side switching mechanism (40) and a pin protrusion (52) that switch, in a neutral position, the self-rotation pin (50) from a released state to a restricted state.

14 Claims, 9 Drawing Sheets

(51) Int. Cl.
    *B60R 16/027* (2006.01)
    *H01R 35/04* (2006.01)

(56) References Cited

FOREIGN PATENT DOCUMENTS

| | | |
|---|---|---|
| JP | 2012-209016 | 10/2012 |
| JP | 2014-039438 | 2/2014 |

\* cited by examiner

1 ··· ROTARY CONNECTOR DEVICE
10 ··· ROTATOR
11 ··· ROTATOR-SIDE RING PLATE
12 ··· ROTATOR-SIDE INNER-CIRCUMFERENTIAL CYLINDRICAL PORTION
20 ··· STATOR
22 ··· STATOR-SIDE OUTER-CIRCUMFERENTIAL CYLINDRICAL PORTION

FIG. 3A

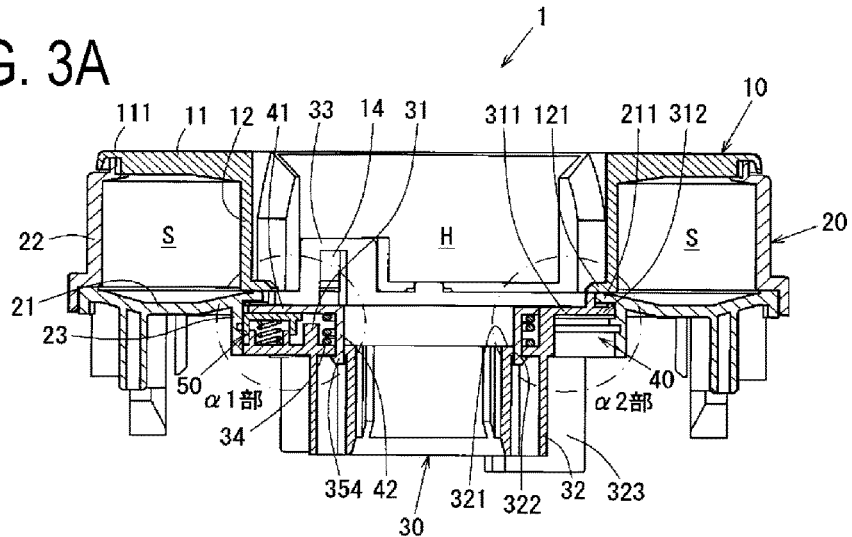

FIG. 3B

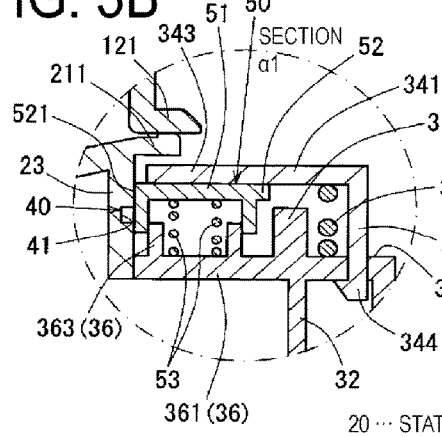

FIG. 3C

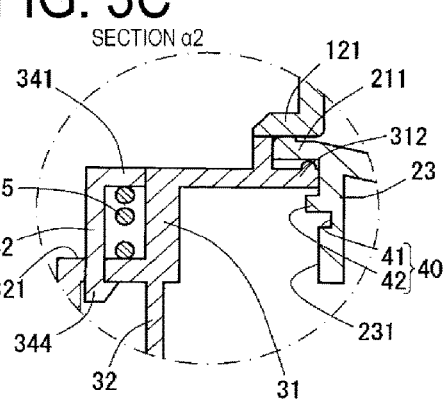

1 ⋯ ROTARY CONNECTOR DEVICE
10 ⋯ ROTATOR
11 ⋯ ROTATOR-SIDE RING PLATE
12 ⋯ ROTATOR-SIDE INNER-CIRCUMFERENTIAL CYLINDRICAL PORTION
20 ⋯ STATOR
21 ⋯ STATOR-SIDE RING PLATE
22 ⋯ STATOR-SIDE OUTER-CIRCUMFERENTIAL CYLINDRICAL PORTION
23 ⋯ STATOR-SIDE INNER-CIRCUMFERENTIAL CYLINDRICAL PORTION
231 ⋯ STATIONARY-SIDE GEAR
30 ⋯ SLEEVE
40 ⋯ STATIONARY-SIDE SWITCHING MECHANISM
50 ⋯ SELF-ROTATION PIN
52 ⋯ PIN PROTRUSION
521 ⋯ PIN-SIDE NOTCH
53 ⋯ SECOND SPRING MEMBER

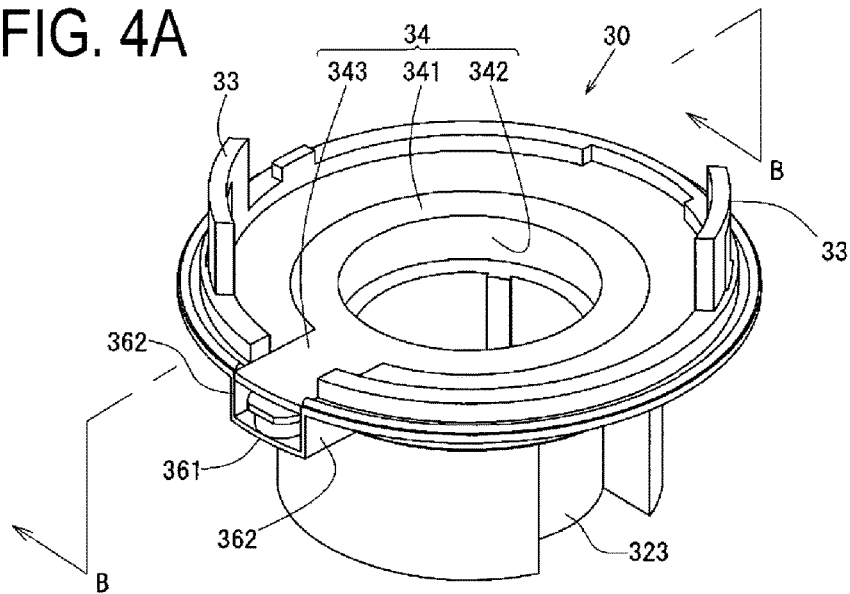
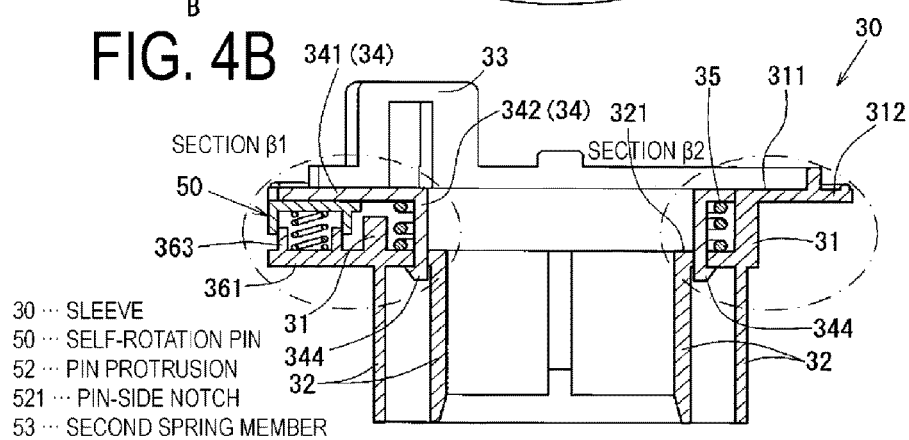
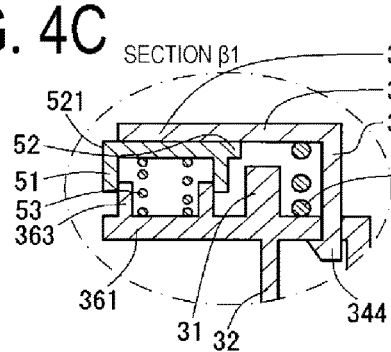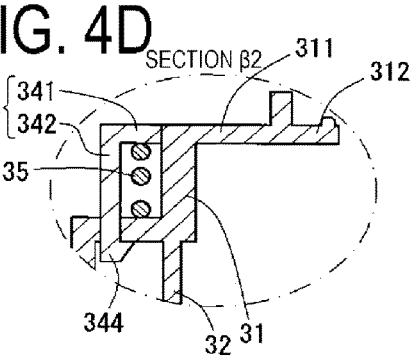

20 ··· STATOR
23 ··· STATOR-SIDE INNER-CIRCUMFERENTIAL CYLINDRICAL PORTION
231 ··· STATIONARY-SIDE GEAR
40 ··· STATIONARY-SIDE SWITCHING MECHANISM
421 ··· RIB-SIDE NOTCH

50 ⋯ SELF-ROTATION PIN
511 ⋯ SELF-ROTATION-SIDE GEAR
52 ⋯ PIN PROTRUSION
521 ⋯ PIN-SIDE NOTCH

20 ··· STATOR
23 ··· STATOR-SIDE INNER-CIRCUMFERENTIAL CYLINDRICAL PORTION
40 ··· STATIONARY-SIDE SWITCHING MECHANISM
421 ··· RIB-SIDE NOTCH
50 ··· SELF-ROTATION PIN
52 ··· PIN PROTRUSION
521 ··· PIN-SIDE NOTCH
53 ··· SECOND SPRING MEMBER

20 ··· STATOR
23 ··· STATOR-SIDE INNER-CIRCUMFERENTIAL CYLINDRICAL PORTION
40 ··· STATIONARY-SIDE SWITCHING MECHANISM
421 ··· RIB-SIDE NOTCH
50 ··· SELF-ROTATION PIN
52 ··· PIN PROTRUSION
521 ··· PIN-SIDE NOTCH
53 ··· SECOND SPRING MEMBER

1a ··· ROTARY CONNECTOR DEVICE
20a ··· STATOR
23a ··· STATOR-SIDE INNER-CIRCUMFERENTIAL CYLINDRICAL PORTION
231a ··· STATIONARY-SIDE GEAR
40a ··· STATIONARY-SIDE SWITCHING MECHANISM
421 ··· RIB-SIDE NOTCH
50 ··· SELF-ROTATION PIN
52 ··· PIN PROTRUSION
521 ··· PIN-SIDE NOTCH
53 ··· SECOND SPRING MEMBER

ROTARY CONNECTOR DEVICE

TECHNICAL FIELD

This invention relates to a rotary connector device mounted on a vehicle body such as an automobile.

BACKGROUND ART

For example, a rotary connector device mounted on a steering shaft of a vehicle body, such as an automobile, has a configuration in which a rotator and a stator are assembled in a relatively rotatable manner, and a flexible flat cable (hereinafter referred to as a flat cable) that is wound into a spiral shape is housed in an annular housing space formed between the rotator and the stator.

The length of the flat cable is adjusted such that, when a steering wheel or the like is assembled to the rotary connector device that is in a neutral position, the steering wheel can be rotated, with respect to the steering shaft, by a maximum number of rotations substantially equally in both rotational directions, namely, in the clockwise direction and the counterclockwise direction.

More specifically, in the rotary connector device, the length of the flat cable is adjusted such that the rotator can be rotated in each of both the rotational directions by the maximum number of rotations while following the steering of the steering wheel.

Thus, in a case in which the rotary connector device is assembled to the vehicle body when it is not in the neutral position, even when the steering wheel is steered in one direction of both the rotational directions by the maximum number of rotations, the flat cable is more than long enough. However, when the steering wheel is steered in the other direction of both the rotational directions, there is a risk that the flat cable may become damaged or broken as a result of the rotary connector device being rotated beyond its rotatable range.

In response to such a problem, in Patent Document 1, for example, a rotary connector device is disclosed that is provided with a fixing member including a cover that covers a connector provided in the rotator in a neutral position, and a fitting hole that is fitted with a protrusion provided in the stator.

The rotary connector device described in Patent Document 1 is considered to be capable of fixing the stator and the rotator in the neutral position by covering the connector with the cover provided in the fixing member, and also by causing the fitting hole to be fitted with the protrusion.

However, with the rotary connector device having the above-described configuration, when the steering wheel is temporarily removed from the steering shaft to perform an inspection, a repair, a replacement or the like, the rotator becomes relatively rotatable with respect to the stator.

When the rotary connector device is relatively rotated as a result of temporarily removing the steering wheel, a problem arises in which the neutral position cannot be found. Therefore, when a steering device, such as the steering wheel, is reassembled with the rotary connector device, there is a risk that the rotary connector device and the steering device may be assembled together in a state in which the neutral positions of the rotary connector device and the steering device are displaced with respect to each other.

CITATION LIST

Patent Literature

Patent Document 1: JP 07-249468 A

SUMMARY OF INVENTION

Technical Problem

In light of the foregoing, an object of this invention is to provide a rotary connector device capable of enabling a relative rotation between a rotator and a stator to be easily and reliably fixed at a neutral position even when a steering device is dismounted.

Solution to Problem

This invention is a rotary connector device in which a rotator configured by an annular rotator-side ring plate and a cylindrical inner-circumferential portion formed on an inner-circumferential edge of the rotator-side ring plate, and a stator configured by an annular stator-side ring plate and a cylindrical outer-circumferential cylindrical portion formed on an outer-circumferential edge of the stator-side ring plate are fitted with each other so as to be relatively rotatable in both of rotational directions that are a clockwise direction and a counterclockwise direction. The rotary connector device includes: a self-rotation member provided in at least one of the rotator and the stator so as to be self-rotatable and provided with a rotation restrictor that restricts the self-rotation by coming into contact with another one of the rotator and the stator; a rotation transmitter that transmits the relative rotation and the self-rotation in an interlocked manner; and a switching unit that switches, in a neutral position, a released state, in which restriction of the self-rotation by the rotation restrictor is released, to a restricted state in which the self-rotation is restricted as a result of the contact of the rotation restrictor.

The rotator includes a rotator that is configured by being integrally assembled with a separate member such as a sleeve, for example.

The self-rotation includes self-rotation around a self-rotation axis parallel with a rotation axis of the relative rotation, and self-rotation around a self-rotation axis in a direction orthogonal to or intersecting with the rotation axis of the relative rotation.

The rotation transmitter is a rotation transmitter that causes the self-rotation of the self-rotation member and the relative rotation to occur in a mutually interlocked manner, by transmitting a rotational force of the self-rotation and a rotational force of the relative rotation to each other, and may have a configuration causing the interlocked rotation in which a separate member, such as gears respectively provided in the self-rotation member and the other one of the rotator and the stator, gears on which teeth are arranged at predetermined intervals, or a belt is provided.

The neutral position refers to a position from which the rotator can rotate with respect to the stator substantially equally in both the rotational directions. More specifically, the neutral position refers to positions of the rotator and the stator when the rotator can rotate with respect to the stator substantially equally in both the rotational directions.

The switching unit refers to a mechanism that switches the released state to the restricted state by enabling at least the rotation restrictor to move to the position in which it comes into contact with the other one of the rotator and the stator in the neutral position.

Note that the switching unit may be configured by being integrally formed with the rotator or the stator, or may be configured by using a separate member.

With this invention, even when a steering device is disengaged from the rotary connector device, more specifically, even when a steering wheel is removed from the rotary connector device, the relative rotation between the rotator and the stator can be easily and reliably restricted in the neutral position.

In more detail, when the rotator is positioned in the neutral position after having been relatively rotated with respect to the stator, the released state can be switched to the restricted state by the switching unit. As a result, the self-rotation of the self-rotation member can be restricted, and the relative rotation interlocked with the self-rotation can be restricted by the rotation transmitter.

More specifically, simply by relatively rotating the rotator with respect to the stator, the rotary connector device can be switched to the restricted state in the neutral position, and the relative rotation interlocked with the self-rotation can be indirectly restricted.

In this way, even when the steering device is disengaged, the rotary connector device can easily and reliably fix the rotator and the stator such that the rotator does not relatively rotate with respect to the stator in the neutral position only. More specifically, even when the steering wheel is removed from the rotary connector device, with respect to the rotary connector device in a relatively rotatable state, the relative rotation can be restricted in the neutral position only. Thus, the steering wheel in a neutral position can be easily and reliably mounted while maintaining the neutral position of the rotary connector device.

As an aspect of this invention, the switching unit can be configured by a movement unit that moves, in the neutral position, the rotation restrictor between a restricted position in which the self-rotation is restricted and a released position in which the restriction of the self-rotation is released, and a movement restrictor that restricts the movement from the released position to the restricted position in a position other than the neutral position.

The restricted position refers to a position in which the rotation restrictor comes into contact with the other one of the rotator and the stator.

The released position refers to a position in which the rotation restrictor does not come into contact with the other one of the rotator and the stator, and includes a position, of the other one of the rotator and the stator, in which a groove, a recess or the like is provided in order to prevent the rotation restrictor from coming into contact with the other one of the rotator and the stator.

The movement unit includes a movement unit configured by an urging member, such as a spring and rubber, which enables the rotation restrictor to move between the restricted position and the released position, and a movement unit having a configuration that causes the rotation restrictor to move between the restricted position and the released position manually or as a result of coming into contact with another member, for example.

The movement restrictor may be any movement restrictor as long as it is able to restrict the self-rotation member from moving between the restricted position and the released position in a position other than the neutral position. For example, the movement restrictor includes a movement restrictor that restricts the movement of the self-rotation member by causing a surface of a rib or a groove provided in a position other than the neutral position to come into contact with a rib provided in the self-rotation member, and a movement restrictor that restricts the movement of the self-rotation member by using a separate member.

Since this invention can reliably restrict the rotation restrictor from moving from the released position to the restricted position in a position other than the neutral position, it is possible to reliably prevent the relative rotation from being restricted in a position other than the neutral position. More specifically, the relative rotation can be restricted only in the neutral position.

Thus, even when the steering wheel is removed from the rotary connector device, the rotation can be reliably restricted in the neutral position. Thus, a steering device, such as the steering wheel, can be reliably assembled to the rotary connector device in the neutral position.

As another aspect of this invention, the movement unit can be configured by a recovery unit that recovers the rotation restrictor from the released position to the restricted position in the neutral position.

The recovery unit refers to a configuration that causes the rotation restrictor to be moved to the position in which the rotation restrictor comes into contact with the other one of the rotator and the stator as a result of the rotation restrictor being disposed in the neutral position. More specifically, the recovery unit includes a configuration that recovers the rotation restrictor to the restricted position by using an urging force of an elastic body such as a spring and rubber, and a configuration that recovers the rotation restrictor to the restricted position by using gravity.

With this invention, the rotation restrictor can automatically move from the released position to the restricted position in the neutral position, so the self-rotation of the self-rotation member can be easily restricted. Thus, the relative rotation can be more easily and reliably restricted in the neutral position.

As another aspect of this invention, the movement unit can be configured so as to be able to move the rotation restrictor in the neutral position between the restricted position and the released position as a result of a steering device being attached to and removed from the inner-circumferential cylindrical portion.

The steering device refers to a steering wheel that operates the vehicle body, or a steering shaft that transfers the steering of the steering wheel to wheels, for example. The above-described attachment of the steering device means that at least one of the steering wheel or the steering shaft is attached to the rotary connector device.

With this invention, the restricted state in the neutral position can be released by a series of operations for assembling the steering device to the rotary connector device. Thus, the rotary connector device and the steering device can be more easily and reliably assembled together in the neutral position.

Further, when the switching unit is provided in the inner-circumferential cylindrical portion, compared with a case in which the switching unit is provided in a portion other than the inner-circumferential cylindrical portion of the rotary connector device, a possibility of the switching unit interfering with other items and the like can be reduced. Thus, when the rotary connector device is transported, for example, it is possible to prevent the restricted state from being released.

As another aspect of this invention, the movement restrictor can be configured by a first restrictor provided in the self-rotation member and a second restrictor provided in the other one of the rotator and the stator, and the second restrictor can be provided with a movement restriction release portion that releases a restriction on the rotation restrictor from moving from the released position to the restricted position.

With this invention, the movement restriction of the rotation restrictor can be distributed to the self-rotation member side and the side of the other one of the rotator and the stator, and a load applied to the movement restrictor can be reduced. At the same time, since the restriction on the rotation restrictor from moving from the released position to the restricted position can be reliably released in the neutral position, the relative rotation can be restricted by reliably moving the rotation restrictor to the restricted position.

As another aspect of this invention, the first restrictor and the rotation restrictor can be integrally configured.

With this invention, since the rotation restrictor and the movement restrictor can be provided in the self-rotation member, the number of components can be reduced, and the configuration of the rotary connector device can also be simplified.

As another aspect of this invention, when a maximum number of rotations from the neutral position in each of both the rotational directions is defined as a neutral maximum number of rotations, the rotation transmitter can be configured to transmit the self-rotation and the relative rotation while causing a ratio of a number of the self-rotations with respect to a number of the relative rotations to be reduced to be equal to or greater than the neutral maximum number of rotations.

The neutral maximum number of rotations refers to a maximum number of rotations by which the rotator can be rotated with respect to the stator in each of the clockwise direction and the counterclockwise direction. For example, when the rotator can be rotated by 2.5 rotations in each of both the rotational directions, the neutral maximum number of rotations is 2.5. Note that the neutral maximum number of rotations is a value that varies depending on a design of the vehicle body, and the like.

With this invention, the rotation restrictor can be reliably prevented from coming into contact with the other one of the rotator and the stator in a position other than the neutral position.

In more detail, as a result of configuring the rotation transmitter such that the relative rotation and the self-rotation are transmitted while causing the ratio of the number of self-rotations with respect to the number of relative rotations to be equal to or greater than the neutral maximum number of rotations, even when the relative rotations are rotated by the neutral maximum number of rotations, the number of self-rotations of the self-rotation member rotated as a result of the relative rotations can be caused to be less than one rotation.

More specifically, while the relative rotations are being rotated, the rotation restrictor can be prevented from coming into contact with the other one of the rotator and the stator in a position other than the neutral position. Thus, it is possible to reliably prevent the relative rotation from being restricted in a position other than the neutral position.

As another aspect of this invention, the rotation transmitter can be configured so as to transmit to the self-rotation member an integral number of the relative rotations as a non-integral number of rotations, within a range of the neutral maximum number of rotations that is the maximum number of the relative rotations from the neutral position in each of both the rotational directions.

The non-integral number of rotations may be a number greater than one or a number smaller than one. More specifically, a case is included in which the self-rotation is rotated by more than one rotation or less than one rotation, while the relative rotation is being rotated by one rotation.

With this invention, the rotation restrictor can be reliably prevented from coming into contact with the other one of the rotator and the stator in a position other than the neutral position.

In more detail, when the self-rotation is rotated by the integral number of rotations (e.g. one rotation) in response to the relative rotation rotated by the integral number of rotations (e.g. one rotation) from the neutral position in both the rotational directions, the rotation restrictor comes into contact with the other one of the rotator and the stator. However, in this invention, since the self-rotation is rotated from the neutral position by the non-integral number of rotations in response to the integral number of relative rotations from the neutral position in both the rotational directions, the rotation restrictor can be prevented from coming into contact with the other one of the rotator and the stator in a position other than the neutral position.

Note that, when the non-integral number of rotations is set to be a number greater than one, downsizing of the self-rotation member can be achieved.

In more detail, when the configuration of the rotation transmitter is a gear, for example, in order to cause the self-rotation to be rotated by less than one rotation while the relative rotation is being rotated by one rotation, it is necessary to increase the number of teeth on the gear provided on the self-rotation member and thereby reduce the rotational speed of the self-rotation with respect to the relative rotation. In order to increase the number of teeth on the gear in this way, the size of the self-rotation member in which the gear is disposed has to be increased.

On the other hand, when the non-integral number of rotations is set to be a number greater than one, more specifically, when a configuration is adopted in which the self-rotations are rotated by a plurality of rotations while the relative rotation is being rotated by one rotation, there is no need to increase the number of teeth provided in the self-rotation member. The self-rotation member, which does not require an increase in the number of teeth of the gear in this way, can be downsized further compared with a self-rotation member used in a case in which the self-rotation is rotated by less than one rotation while the relative rotation is being rotated by one rotation. Thus, a space for housing the self-rotation member can be reduced, and the rotary connector device can also be downsized.

As another aspect of this invention, the rotation transmitter can be configured by a first gear provided in the self-rotation member, and a second gear provided in the other one of the rotator and the stator so as to engage with the first gear.

The above-described engagement includes a direct engagement and an indirect engagement between the first gear and the second gear. For example, those cases are included in which the first gear and the second gear are directly engaged with each other, and the first gear and the second gear are indirectly engaged with each other by another gear being provided between the first gear and the second gear.

With this invention, since the rotational force of the relative rotation can be reliably transmitted to the self-rotation with a simple configuration, the self-rotation member can be reliably caused to self-rotate. Thus, the rotation restrictor can be reliably prevented from coming into contact with the other one of the rotator and the stator in a position other than the neutral position.

In addition, the first gear and the second gear can be reliably engaged with each other without any gap therebetween, and it is thus possible to prevent the relative rotation from causing idling of the self-rotation. As a result, the rotation can be smoothly transmitted, and at the same time, the rotation restrictor can be more reliably caused to come into contact with the other one of the rotator and the stator in the neutral position, thereby allowing the self-rotation to be reliably restricted. Thus, the accuracy of the restriction of the relative rotation in the neutral position can be improved. Further, since the configuration can be obtained in which the first gear and the second gear are reliably engaged with each other, noise can be prevented from being generated at the time of the relative rotation.

As another aspect of this invention, the rotation restrictor can be configured so as to come into contact with an inner surface of the other one of the rotator and the stator in a radial direction.

With this invention, the rotation restrictor that is integrally configured with the self-rotation member can have a simple configuration, and can be configured so as to reliably come into contact with the inner surface of the other one of the rotator and the stator. Thus, the relative rotation can be restricted as a result of restricting the self-rotation.

Advantageous Effects of Invention

With this invention, a rotary connector device can be provided that enables a relative rotation between the rotator and the stator to be easily and reliably fixed in the neutral position even when the steering device is dismounted.

BRIEF DESCRIPTION OF DRAWINGS

FIGS. 3A to 3C are schematic cross-sectional views of the rotary connector device.

FIGS. 4A to 4D are explanatory diagrams of a sleeve.

FIGS. 5A to 5I) are explanatory diagrams of a stator-side inner-circumferential cylindrical portion.

DESCRIPTION OF EMBODIMENTS

An embodiment of this invention will be described below with reference to the drawings.

Figure 1:
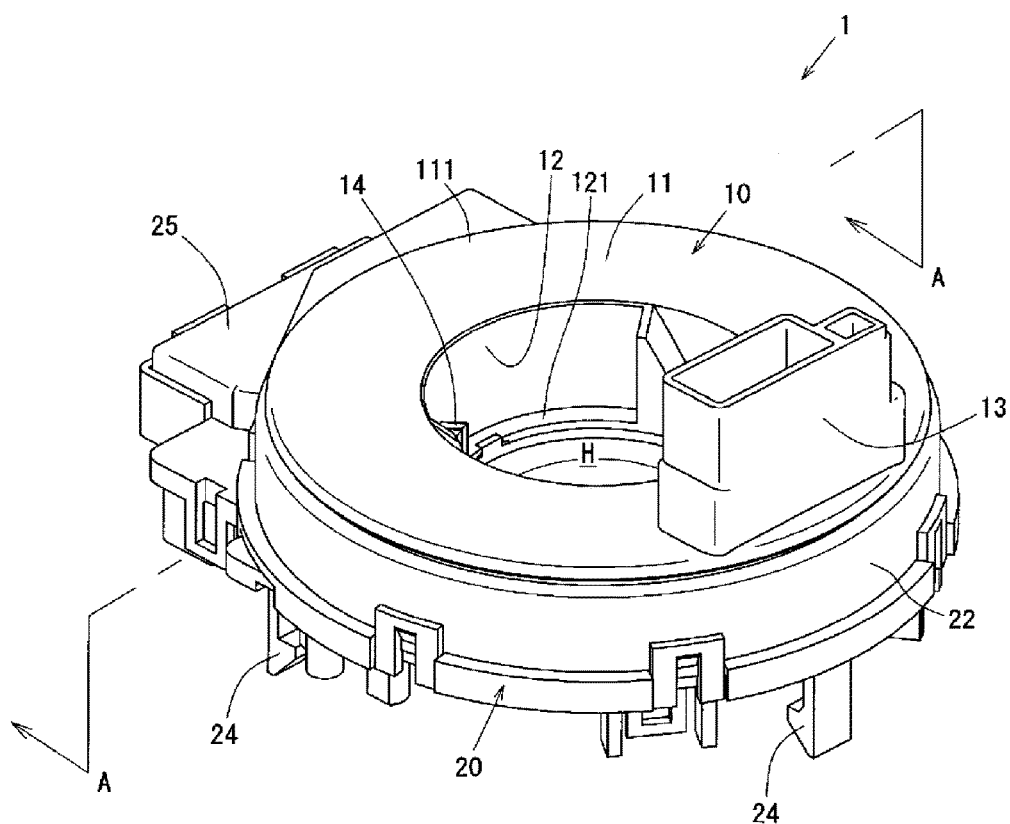
FIG. 1 is a schematic perspective view of a rotary connector device.
Figure 2:
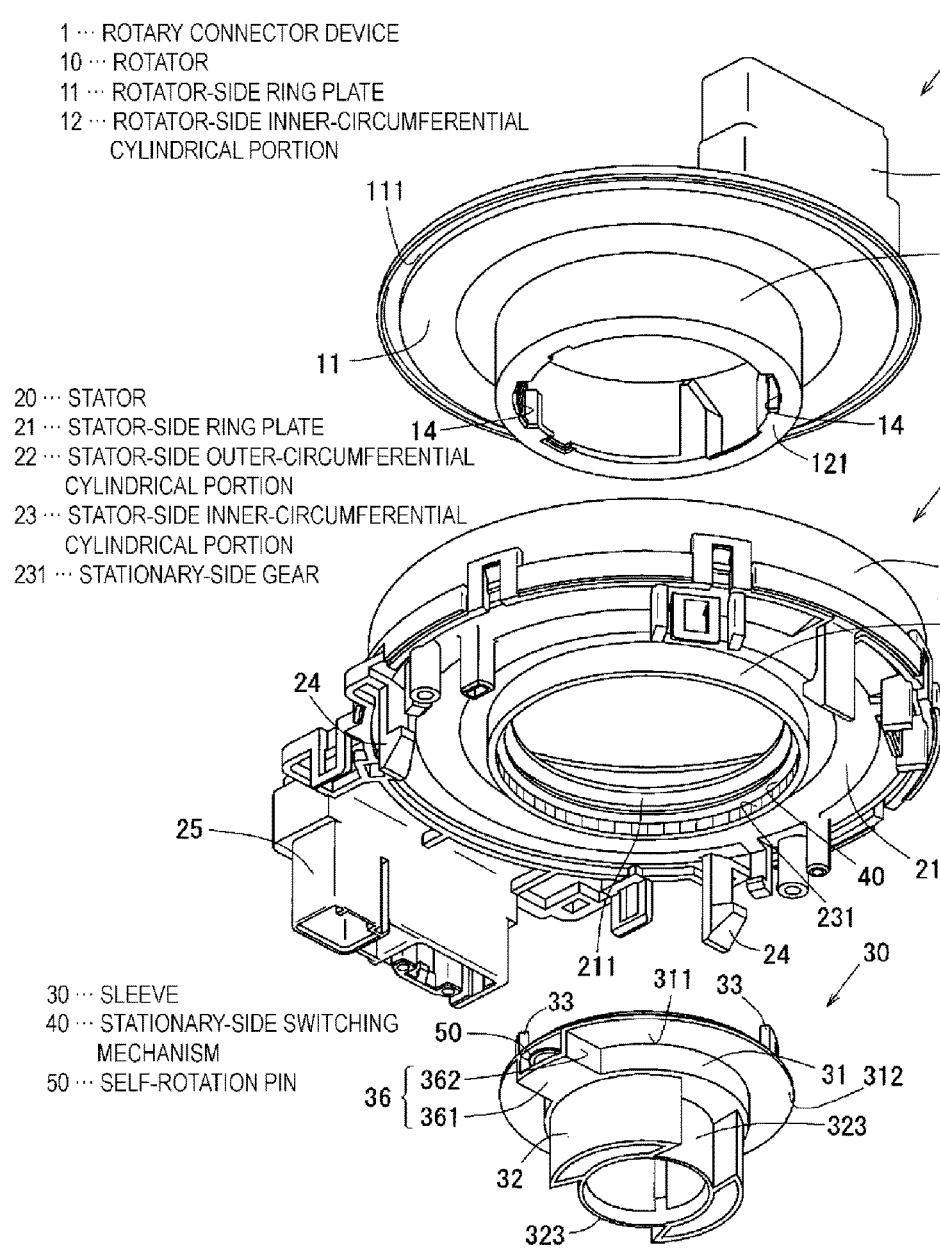
FIG. 2 is a schematic exploded perspective view of the rotary connector device.

FIG. 1 is a schematic perspective view of a rotary connector device 1 when viewed from above, and FIG. 2 is a schematic exploded perspective view of the rotary connector device 1 when viewed from below.

FIGS. 3A to 3C are schematic cross-sectional views of the rotary connector device 1. More specifically, FIG. 3A is a schematic cross-sectional view taken along a line A-A in FIG. 1, FIG. 3B is an enlarged end surface view of a section α1 in FIG. 3A, and FIG. 3C is an enlarged end surface view of a section α2 in FIG. 3A.

FIGS. 4A to 4C are explanatory diagrams of a sleeve 30. More specifically, FIG. 4A is a schematic perspective view of the sleeve 30 when viewed from above, FIG. 4B is a schematic cross-sectional view taken along a line B-B in FIG. 4A, FIG. 4C is an enlarged end surface view of a section β1 in FIG. 4B, and FIG. 4D is an enlarged end surface view of a section β2 in FIG. 4B.

Figure 5A:
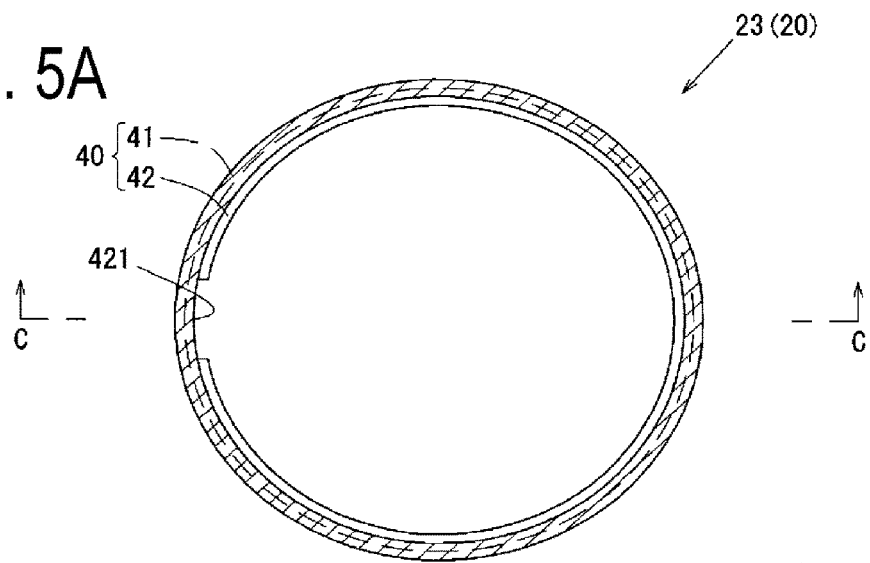
Figure 5B:
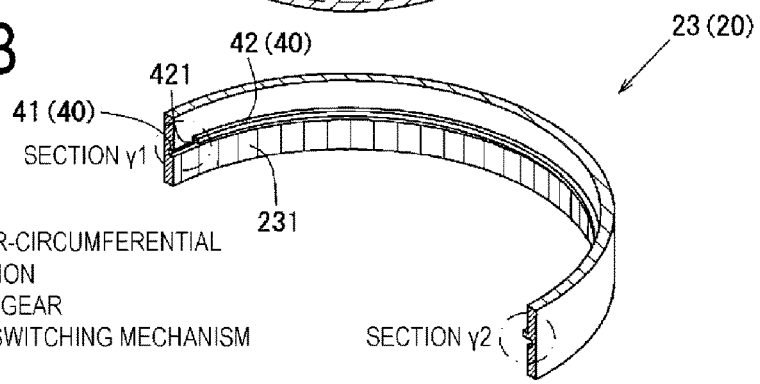
Figures 5C, 5D:
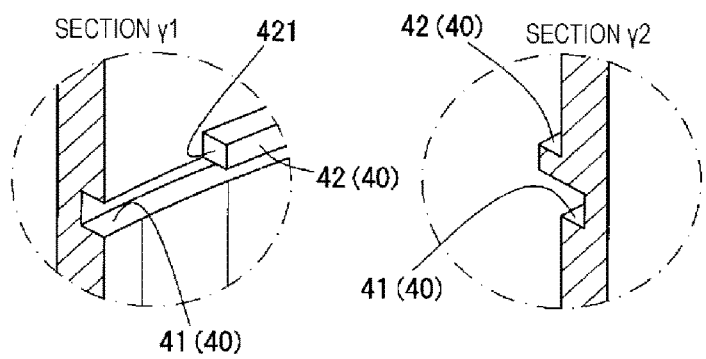

FIGS. 5A to 5D only illustrate a stator-side inner-circumferential cylindrical portion 23 that is cut out from a stator 20 in order to describe a stationary-side switching mechanism 40. More specifically, FIG. 5A is a schematic plan view illustrating only the stator-side inner-circumferential cylindrical portion 23, FIG. 5B is a schematic cross-sectional perspective view taken along a line C-C in FIG. 5A, FIG. 5C is an enlarged view of a section γ1 in FIG. 5B, and FIG. 5D is an enlarged view of a section γ2 in FIG. 5B.

Figure 6A:
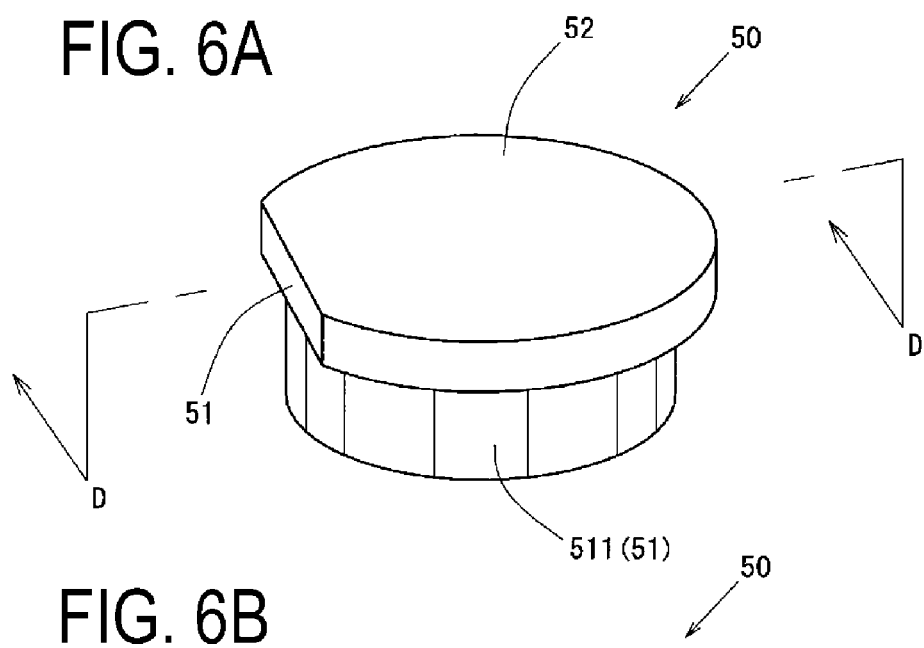
FIGS. 6A and 6B are explanatory diagrams of a self-rotation pin.
Figure 6B:
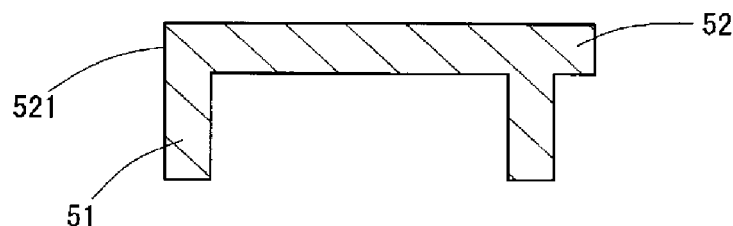

FIGS. 6A and 6B are explanatory diagrams of a self-rotation pin 50. More specifically, FIG. 6A is a schematic perspective view of the self-rotation pin 50 when viewed from above, and FIG. 6B is a schematic cross-sectional view taken along a line D-D in FIG. 6A. Note that a second spring member 53 is not illustrated in FIGS. 6A and 6B.

Figure 7A:
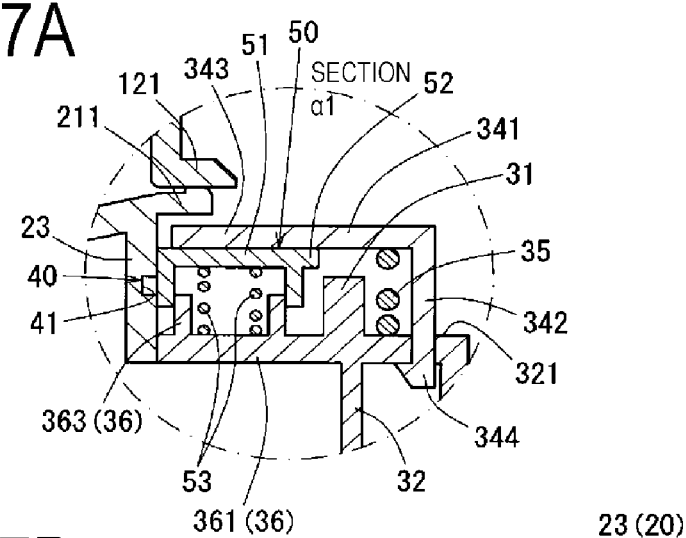
FIGS. 7A and 7B are explanatory diagrams of a restricted state.
Figure 7B:
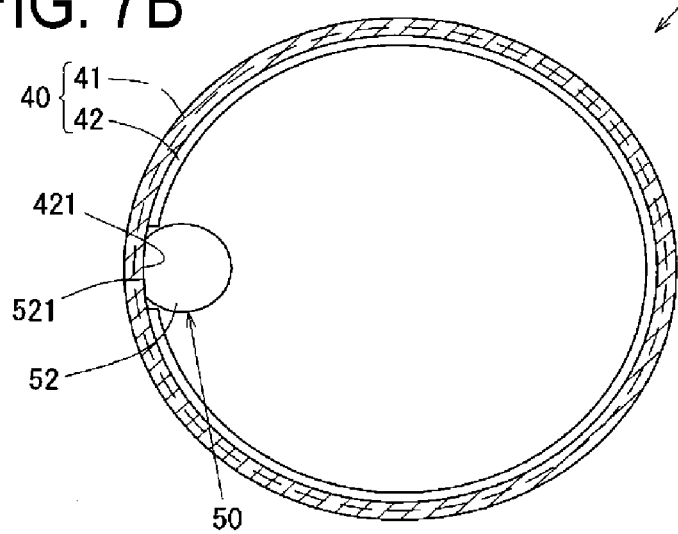

FIGS. 7A and 7B are explanatory diagrams of a restricted state. More specifically, FIG. 7A illustrates the section α1 in FIG. 3A in a state in which the self-rotation pin 50 is disposed in the restricted position, and FIG. 7B illustrates the restricted state of the self-rotation pin 50 with respect to the stator-side inner-circumferential cylindrical portion 23 when viewed from above.

Figure 8A:
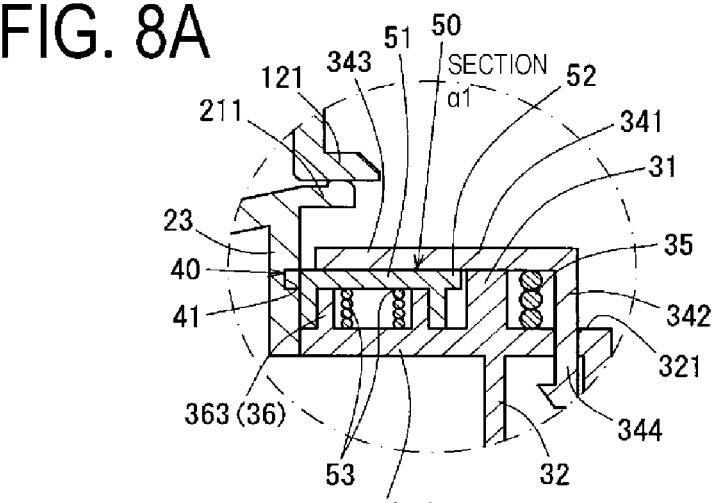
FIGS. 8A and 8B are explanatory diagrams of a released state.
Figure 8B:
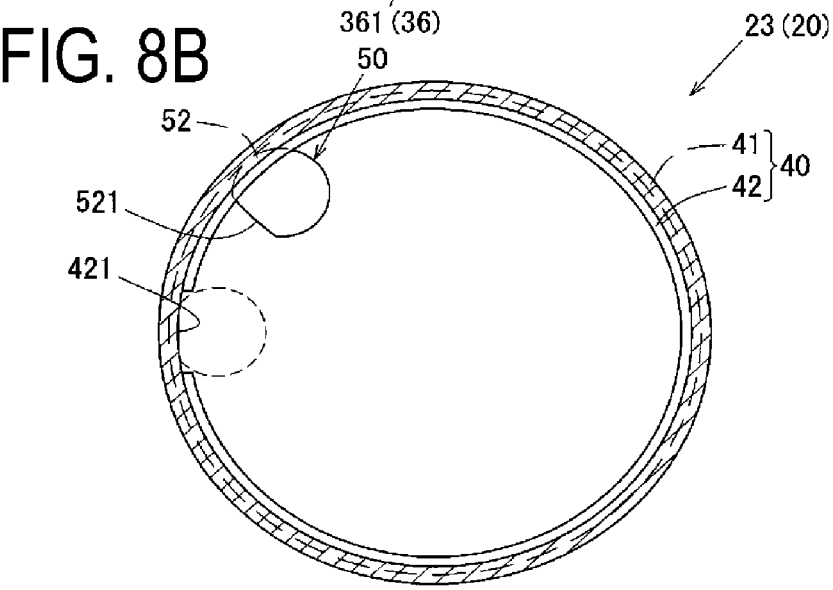

FIGS. 8A and 8B are explanatory diagrams of a released state. More specifically, FIG. 8A illustrates the section α1 in FIG. 3A in a state in which the self-rotation pin 50 is disposed in the released position, and FIG. 8B illustrates the released state of the self-rotation pin 50 with respect to the stator-side inner-circumferential cylindrical portion 23 when viewed from above.

Note that, in the present embodiment, a rotator 10 side is an upper side, and the sleeve 30 side is a lower side, taking the stator 20 as a reference. In addition, when the rotator 10 is viewed from above (in a planar view), the right-hand direction is the clockwise direction, and the left-hand direction is the counterclockwise direction.

As illustrated in FIG. 1 to FIG. 3C, the rotary connector device 1 is configured by assembling the rotator 10 positioned on the upper side, the stator 20 positioned on the lower side, and the sleeve 30 that is fixed by being integrated with the rotator 10. In the assembled state, the rotator 10 and the stator 20 form an annular housing space S that houses a flat cable (not illustrated).

As illustrated in FIG. 1 and FIG. 2, the rotator 10 is integrally configured by a substantially annular rotator-side ring plate 11 including a substantially circular through-hole in a center section thereof in a planar view, and a rotator-side inner-circumferential cylindrical portion 12 formed downwardly from the inner edge of the rotator-side ring plate 11.

A rotator-side connector 13 that functions as a connector protrudes upward from the upper surface of the rotator-side ring plate 11. Note that the outer edge of the rotator-side ring plate 11 is a rotator-side outer-circumferential edge 111.

The rotator-side connector 13 is connected to the flat cable housed in the housing space S, and is also connected to steering-side cables (not illustrated) that are drawn out from an electrical circuit disposed in a steering wheel (not illustrated), such as a horn switch and an air bag unit.

The rotator-side inner-circumferential cylindrical portion 12 is a cylindrical body extending downwardly from the inner edge of the rotator-side ring plate 11, and has an inner diameter identical to the inner diameter of the rotator-side ring plate 11. On the lower end of the rotator-side inner-circumferential cylindrical portion 12, a brim-like rotator-side flange 121 is formed that projects toward the inner-diameter side and that is continuous in the circumferential direction along the lower end-side inner edge of the rotator-side inner-circumferential cylindrical portion 12.

Further, two fixing portions 14 that are used for fixing the rotator 10 with the sleeve 30 are disposed in opposing positions on the inner circumferential surface of the rotator-side inner-circumferential cylindrical portion 12. Note that the number of fixing portions 14 is not limited to two, and may be changed as desired by changing the design, as long as the fixing portions 14 can fix the rotator 10 and the sleeve 30 together by being locked with plate-like fixing frames 33, which will be described later.

The inner diameter of the rotator-side inner-circumferential cylindrical portion 12 having the above-described configuration is formed to be one size larger than the diameter of a steering boss (not illustrated), thereby allowing the above-described steering wheel to be inserted from above.

As illustrated in FIG. 1 and FIG. 2, the stator 20 is configured by a substantially annular stator-side ring plate 21 including a substantially circular through-hole in a center section thereof in a planar view, a substantially cylindrical stator-side outer-circumferential cylindrical portion 22 extending upwardly from the outer edge of the stator-side ring plate 21, and a substantially cylindrical stator-side inner-circumferential cylindrical portion 23 extending downwardly from the vicinity of a stator-side inner-circumferential edge 211 of the stator-side ring plate 21.

On the bottom surface of the stator-side ring plate 21, fixing claws 24 are provided that are fixed to a combination switch bracket (not illustrated), and further to the outer-diameter side than the stator-side ring plate 21, a stator-side connector 25, which functions as a connector, protrudes downwardly.

As illustrated in FIGS. 3A to 3C, the width of the stator-side inner-circumferential edge 211 of the stator-side ring plate 21 is slightly narrower than that of the rotator-side flange 121 when viewed from above, and the stator-side inner-circumferential edge 211 is disposed below the rotator-side flange 121 in a state in which the rotator 10 and the stator 20 are assembled together.

The stator-side outer-circumferential cylindrical portion 22 is formed in a cylindrical shape extending in the up-down direction, while having a diameter slightly smaller than the outer diameter of the rotator-side ring plate 11. More specifically, the stator-side outer-circumferential cylindrical portion 22 is disposed below the rotator-side outer-circumferential edge 111 in the state in which the rotator 10 and the stator 20 are assembled together.

The inner diameter of the stator-side inner-circumferential cylindrical portion 23 is formed to be one size larger than the stator-side ring plate 21. In other words, a mode is adopted in which the stator-side inner-circumferential edge 211 protrudes toward the inner-diameter side of the stator-side inner-circumferential cylindrical portion 23.

On the inner-circumferential surface of this stator-side inner-circumferential cylindrical portion 23, a stationary-side gear 231 is formed along the circumferential direction below a substantially center section of the inner-circumferential surface in the up-down direction, and the stationary-side switching mechanism 40 is provided (see FIG. 5B) that switches between the restricted state, in which self-rotation of the self-rotation pin 50 (to be described later) is restricted, and the released state in which the restriction is released. Note that the stationary-side gear 231 is configured by 110 teeth.

The stator-side connector 25 is connected to the above-described flat cable housed in the housing space S, and is also connected, inside a steering column cover (not illustrated), to a column-side cable (not illustrated) that is drawn out from an electrical circuit disposed on a vehicle body (not illustrated) side.

As illustrated in FIG. 2 and FIGS. 3A to 3C, the sleeve 30 is a fixing member that is assembled from below the stator 20 and fixes the stator 20 with the rotator 10, and has a through-hole that is formed in a center section thereof in a planar view and that penetrates therethrough in the up-down direction.

As illustrated in FIG. 4A and FIG. 4B, this sleeve 30 is integrally configured by a substantially cylindrical upper-end cylindrical portion 31, a lower-end cylindrical portion 32 provided so as to extend downwardly from the lower end of the upper-end cylindrical portion 31, and two of the plate-like fixing frames 33 provided so as to extend upwardly from the upper end of the upper-end cylindrical portion 31. Further, the sleeve 30 is provided with a substantially cylindrical sleeve-side cylindrical body 34 that is pushed downward as a result of the above-described steering boss being mounted, a first spring member 35 that urges the sleeve-side cylindrical body 34 upward, and the self-rotatable self-rotation pin 50.

The upper-end cylindrical portion 31 is a cylindrical body having a diameter smaller than that of the rotator-side inner-circumferential cylindrical portion 12, and on the upper end thereof, a brim-like sleeve-side flange 311 is provided that is continuous in the circumferential direction and protrudes toward the outer-diameter side. Note that an edge of the sleeve-side flange 311 on the outer-diameter side is a sleeve-side outer-circumferential edge 312.

The inner diameter of the sleeve-side flange 311 is smaller than the inner diameter of the stator-side inner-circumferential edge 211, and the outer diameter of the sleeve-side flange 311 is one size larger than the inner diameter of the stator-side inner-circumferential edge 211. Then, below one section of the sleeve-side flange 311 in the circumferential direction, a substantially box-like pin housing 36 is provided that houses the self-rotation pin 50.

The lower-end cylindrical portion 32 is a cylindrical body extending downward from the lower end side of the upper end cylindrical portion 31. The outer diameter of the lower end cylindrical portion 32 is substantially identical to the outer diameter of the upper-end cylindrical portion 31, and the inner diameter thereof is smaller than the inner diameter of the upper-end cylindrical portion 31.

In a lower-end cylindrical portion upper surface 321 that is the upper surface of the lower-end cylindrical portion 32, hole-like lock portions 322 are provided in two opposing positions. Locking portions 344 of a sleeve-side cylindrical body 34, which will be described later, are inserted into the lock portions 322 so as to be locked.

In the outer circumferential surface of the lower end cylindrical portion 32, sleeve-side notches 323 that are cut out in the radial direction are formed along the up-down direction and provided in two opposing positions. These sleeve-side notches 323 have a command cancellation function for canceling a command by causing a combination switch (not illustrated) to be returned to its original position, the combination switch giving a command to an indicator and the like as a result of being tilted.

Further, a section of the lower-end cylindrical portion 32, in which the sleeve-side notches 323 are not provided, seems to have a thickness thicker than that of the upper-end cylindrical portion 31 in appearance. However, the inner part of the lower-end cylindrical portion 32 is formed to be hollow from the lower end to the vicinity of the upper end thereof, so the plate thickness thereof is actually similar to that of other sections.

The plate-like fixing frames 33 are provided so as to extend upward from the outer edge side of the sleeve-side flange 311, and are plate-like frame bodies each having a through-hole in a center section thereof in the radial direction. Two of the fixing frames 33 are disposed in positions lockable with the fixing portions 14 in a state in which the rotator 10 and the sleeve 30 are assembled together.

Note that the number of the plate-like fixing frames 33 provided in the circumferential direction need not be two, and may be changed as desired by changing the design. Further, as long as the fixing frames 33 are disposed in positions in which they can be fixed with the fixing portions 14, the disposal positions may also be changed as desired.

As illustrated in FIGS. 4A to 4D, the sleeve-side cylindrical body 34 is integrally configured by a substantially annular cylindrical body-side ring plate 341 including a substantially circular through-hole in a center section thereof in a planar view, a cylindrical body-side inner-circumferential cylindrical portion 342 formed downwardly from the inner edge of the cylindrical body-side ring plate 341, and a substantially rectangular protruding portion 343 protruding toward the outer-diameter side from one section of the cylindrical body-side ring plate 341 in the circumferential direction.

In a lower-end section of the cylindrical body-side inner-circumferential cylindrical portion 342, the locking portions 344 that protrude downward are provided in two opposing positions.

The first spring member 35 is a coil spring that is attached to the sleeve-side cylindrical body 34 so as to be wound around the outer circumferential surface of the cylindrical body-side inner-circumferential cylindrical portion 342, and is disposed on the lower end cylindrical portion upper surface 321 in a state of being assembled to the sleeve 30.

In a state of holding the first spring member 35 together with the lower-end cylindrical portion upper surface 321 and the upper-end cylindrical portion 31, the sleeve-side cylindrical body 34 having the above-described configuration is supported from below by the first spring member 35 with the locking portions 344 being locked with the lock portions 322.

As described above, the pin housing 36 is provided in the one section of the sleeve-side flange 311 in the circumferential direction, and as illustrated in FIGS. 4A to 4D, is formed in a substantially box-like shape having an open upper surface and an open surface on the outer-diameter side thereof.

In more detail, the pin housing 36 is configured by a bottom surface portion 361 that configures the bottom surface of the pin housing 36 and two side surface portions 362 that are provided with a predetermined spacing therebetween in the circumferential direction, and is formed in the substantially box-like shape having the upper-end cylindrical portion 31 as the surface on the inner-diameter side thereof.

A pin holder 363 that holds the self-rotation pin 50 is provided on the bottom surface portion 361. The pin holder 363 protrudes upward from the bottom surface portion 361, and is formed in a cylindrical shape having an open upper surface.

Note that the open upper surface of the substantially box-like pin housing 36 is closed by the protruding portion 343 in a state in which the pin housing 36 is assembled with the sleeve-side cylindrical body 34.

As illustrated in FIGS. 5A to 5D, the stationary-side switching mechanism 40 is configured by a groove 41 formed along the circumferential direction in a substantially center section, in the up-down direction, of the inner circumferential surface of the stator-side inner-circumferential cylindrical portion 23, and a rib 42.

The groove 41 is formed in a groove-like shape recessed toward the outer-diameter side of the stator-side inner-circumferential cylindrical portion 23, and is continuous in the circumferential direction.

The rib 42 is formed in a convex shape protruding toward the inner-diameter side of the stator-side inner-circumferential cylindrical portion 23, and is provided over a section excluding the portion corresponding to the outer-diameter side of the pin housing 36. Specifically, the rib 42 is provided with a rib-side notch 421 that is formed by cutting out the section corresponding to the outer-diameter side of the pin housing 36.

The upper surface of the groove 41 and the bottom surface of the rib 42 are aligned with each other in the up-down direction.

As illustrated in FIG. 6A and FIG. 6B, the self-rotation pin 50 is configured by a cylindrical pin main body 51 with only the bottom surface thereof being open, and a pin protrusion 52 that protrudes toward the outer-diameter side from the upper-end side outer edge of the pin main body 51. Also, as illustrated in FIGS. 4B to 4D, a second spring member 53 is provided inside the pin main body 51.

As illustrated in FIGS. 4B to 4D, the inner diameter of the pin main body 51 is formed to be similar to the outer diameter of the pin holder 363, and the pin main body 51 is inserted into the pin holder 363 so as to be freely self-rotatable. As illustrated in FIG. 6A and FIG. 6B, a self-rotation-side gear 511 is formed along the circumferential direction on the outer circumferential surface of the pin main body 51. Note that the self-rotation-side gear 511 is configured by 15 teeth.

As illustrated in FIG. 6A and FIG. 6B, except one section thereof in the circumferential direction, the pin protrusion 52 protrudes toward the outer-diameter side approximately by the plate thickness, and is provided with a pin-side notch 521 formed by cutting out one portion, in the circumferential direction, of a substantially circular shape, in a planar view, protruding from the pin main body 51.

The pin-side notch 521 is provided in a mode in which it is formed exclusively in one section of the pin protrusion 52 in the circumferential direction.

The second spring member 53 is configured by a coil spring similar to the first spring member 35.

As illustrated in FIGS. 4A to 4C, in a state of being held by the pin holder 363, the self-rotation pin 50 having the above-described configuration is supported from below by the second spring member 53 disposed inside the pin main body 51. Also, an upward movement of the self-rotation pin 50 is restricted by the protruding portion 343 of the sleeve-side cylindrical body 34 assembled to the sleeve 30.

Then, the self-rotation pin 50 moves in the up-down direction when the pin-side notch 521 is oriented toward the outer-diameter side and positioned in alignment with the rib-side notch 421.

When the self-rotation pin 50 is supported from below by the second spring member 53 and is in an upper position, a restricted state (see FIG. 7A and FIG. 7B) is obtained in which the self-rotation of the self-rotation pin 50 is restricted as a result of the pin-side notch 521 oriented toward the outer-diameter side being in contact with the inner circumferential surface of the stator-side inner-circumferential cylindrical portion 23. Note that, in the description below, a position of the self-rotation pin 50 in the restricted state will be referred to as a restricted position.

The rotary connector device 1, which is assembled by sandwiching the stator 20 having the above-described configuration between the rotor 10 and the sleeve 30, is configured such that the rotor 10 and the sleeve 30 are relatively rotatable with respect to the stator 20.

The rotary connector device 1 in which the rotor 10, the stator 20, and the sleeve 30 have been assembled, will be described below.

As illustrated in FIG. 2, in the rotary connector device 1, the rotor 10 in which the rotor-side ring plate 11 is disposed so as to face upward, the stator 20 in which the stator-side ring plate 21 is disposed so as to face downward, and the sleeve 30 in which the plate-like fixing frames 33 are disposed so as to face upward are disposed in this order from the top.

The rotor 10 and the sleeve 30 are integrally fixed with each other by moving each of the rotor 10 and the sleeve 30 toward the stator 20 side, sandwiching the stator-side inner-circumferential edge 211 by the rotor-side flange 121 and sleeve-side flange 311 in the up-down direction, and causing the fixing portions 14 to be locked with the plate-like fixing frames 33. In this way, the rotor 10 and the sleeve 30 are configured so as to be relatively rotatable with respect to the stator 20.

As illustrated in FIG. 3A, in the rotary connector device 1, the annular housing space S that houses the above-described flat cable is formed by the rotor-side ring plate 11 and the rotor-side inner-circumferential cylindrical portion 12, and the stator-side ring plate 21 and the stator-side outer-circumferential cylindrical portion 22.

In addition, in the rotary connector device 1, an insertion hole H is formed into which the above-described steering shaft can be mounted from the stator 20 side, and into which the above-described steering boss can be inserted from the rotor 10 side.

Further, in the rotary connector device 1, the stationary-side gear 231 of the stator 20 is engaged with the self-rotation-side gear 511 of the self-rotation pin 50 provided in the sleeve 30, and the relative rotation of the rotor 10 and the sleeve 30 with respect to the stator 20 in both the rotational directions, namely, in the clockwise direction and the counterclockwise direction, is interlocked with the self-rotation of the self-rotation pin 50.

Note that the rotary connector device 1 according to the present embodiment is initially disposed in a neutral position in which the rotor 10 and the sleeve 30 can relatively rotate with respect to the stator 20 by 2.5 rotations in each of both the rotational directions, namely, in each of the clockwise direction and the counterclockwise direction, and the self-rotation pin 50 is initially disposed in the restricted position. In the description below, a state in which the rotor 10 and the sleeve 30 are disposed in the neutral position will be referred to as a neutral state, and a state in which the rotor 10 and the sleeve 30 are disposed in any position other than the neutral position will be referred to as a non-neutral state.

As illustrated in FIG. 7A, in the rotary connector device 1 that is in the neutral state, since the pin-side notch 521 is oriented toward the outer-diameter side and in contact with the inner circumferential surface of the stator-side inner-circumferential cylindrical portion 23, the self-rotation of the self-rotation pin 50 is restricted. This state is the restricted state.

Since the restricted self-rotation of the self-rotation pin 50 is interlocked with the relative rotation via the stationary-side gear 231 and the self-rotation-side gear 511, the relative rotation is also restricted as a result of the self-rotation being restricted. At this time, the self-rotation pin 50 is supported by the second spring member 53 to be in an upper restricted position.

A method for releasing the above-described neutral state of the rotary connector device 1 will be described.

The rotary connector device 1 in the neutral state is mounted on the above-described vehicle body as a result of the above-described steering shaft being inserted from below into the insertion hole H and the above-described steering boss being inserted from above into the insertion hole H.

As a result of the above-described steering boss, which has been inserted into the insertion hole H, pressing the sleeve-side cylindrical body 34, the protruding portion 343 is pressed downward along with the sleeve-side cylindrical body 34, and the self-rotation pin 50 supported upward by the second spring member 53 is also pressed downward along with the protruding portion 343.

In this way, since the self-rotation pin 50 is positioned below the restricted position while resisting the urging force of the second spring member 53, and the pin protrusion 52 becomes capable of passing through the groove 41 of the stationary-side switching mechanism 40, the released state is obtained in which the restricted state of the self-rotation is released (see FIG. 8A and FIG. 8B), and the rotor 10 and the sleeve 30 become relatively rotatable with respect to the stator 20. Note that, in the description below, the position of the self-rotation pin 50 in the released state will be referred to as the released position.

Since the self-rotation-side gear 511 and the stationary-side gear 231 are engaged with each other, when the rotor 10 and the sleeve 30 relatively rotate with respect to the stator 20, the self-rotation pin 50 in the released state self-rotates, and at the same time, relatively rotates with respect to the stator 20 along with the sleeve 30 (see FIG. 7B and FIG. 8B). The movement, to the restricted position, of the self-rotation pin 50 that has been relatively rotated and moved to a non-neutral position, is restricted by the pin protrusion 52 being in contact with the upper surface of the groove 41 or the bottom surface of the rib 42.

Next, a method for restricting the relative rotation of the rotary connector device 1 in the released state will be described.

When the above-described steering wheel is removed from the rotary connector device 1 that is in the neutral state, the sleeve-side cylindrical body 34 that has been pressed by the above-described steering boss is caused to move upward by the first spring member 35, and at the same time, the self-rotation pin 50 is caused to move from the released position to the upper restricted position by the second spring member 53. As a result, since the pin-side notch 521, which is in contact with the inner circumferential surface of the stator-side inner-circumferential cylindrical portion 23, restricts the self-rotation of the self-rotation pin 50, the relative rotation of the rotary connector device 1 is restricted.

When the above-described steering wheel is removed from the rotary connector device 1 that is in the non-neutral state, the sleeve-side cylindrical body 34 that has been pressed by the above-described steering boss is caused to move upward by the first spring member 35, but the self-rotation pin 50 cannot move from the released position to the upper restricted position due to the pin protrusion 52, which is in contact with the upper surface of the groove 41 or the bottom surface of the rib 42. Thus, the rotary connector device 1 remains in the relatively rotatable state.

In this case, when the rotary connector device 1 is relatively rotated in either of the rotational directions in a random manner and thus caused to be in the neutral state, since the pin-side notch 521 is oriented toward the outer-diameter side, neither the bottom surface of the groove 41 nor the upper surface of the rib 42 comes into in contact with the pin protrusion 52. As a result, the self-rotation pin 50 is caused to move from the released position to the restricted position by the second spring member 53, and the relative rotation of the rotary connector device 1 is restricted.

Further, even when the pin-side notch 521 is oriented toward the outer-diameter side, the self-rotation pin 50, which is in the non-neutral position due to rotating by other than a full number of rotations (a non-integral number of rotations), never moves to the restricted position, since the pin protrusion 52 is in contact with the bottom surface of the rib 42 that configures the stationary-side switching mechanism 40.

In addition, since the self-rotation pin 50 and the stationary-side gear 231 are respectively configured by 15 teeth and 110 teeth, in a state in which the rotator 10 has been rotated from the neutral position by one rotation or two rotations in the clockwise direction or the counterclockwise direction, the pin-side notch 521 is never oriented toward the outer-diameter side.

Thus, the self-rotation pin 50 can only be moved from the released position to the restricted position when in the neutral position. As a result, the rotary connector device 1 is relatively rotatable in the non-neutral position, and at the same time, the relative rotation thereof is restricted when in the neutral position.

The rotary connector device 1 configured as described above is provided with: the self-rotation pin 50 that is self-rotatable with respect to the sleeve 30 and provided with the pin-side notch 521 that restricts the self-rotation of the self-rotation pin 50 by coming into contact with the inner circumferential surface of the stator-side inner-circumferential cylindrical portion 23; the stationary-side gear 231 and the self-rotation-side gear 511 that transmit the relative rotation and the self-rotation in an interlocked manner; and the stationary-side switching mechanism 40 and the pin protrusion 52 that cause the state of the self-rotation pin 50 to be switched between the released state and the restricted state. Thus, even when the above-described steering wheel is removed from the rotary connector device 1, the relative rotation of the rotary connector device 1 can be easily and reliably restricted in the neutral position.

In more detail, in a state in which the above-described steering wheel is removed from the rotary connector device 1, when the rotator 10 is relatively rotated with respect to the stator 20, the second spring member 53 can only cause the self-rotation pin 50 to be moved from the released position to the restricted position when in the neutral position. At this time, since the pin-side notch 521 is in contact with the stator-side inner-circumferential cylindrical portion 23, the self-rotation of the self-rotation pin 50 can be restricted, and the relative rotation that is interlocked with the self-rotation pin 50 can be restricted.

More specifically, simply by relatively rotating the rotator 10 with respect to the stator 20, the self-rotation pin 50 can be switched to the restricted state in the neutral position, and the relative rotation that is interlocked with the self-rotation pin 50 can be indirectly restricted.

In this way, with the rotary connector device 1, even in a state in which the above-described steering wheel is removed, the relative rotation of the rotator 10 with respect to the stator 20 can be restricted in the neutral position only, and the above-described steering wheel that is in a neutral position can be easily and reliably mounted while maintaining the neutral state of the rotary connector device 1.

Further, the second spring member 53 that enables the self-rotation pin 50 in the neutral position to move from the released position to the restricted position, and the stationary-side switching mechanism 40 and the pin protrusion 52 that restrict the self-rotation pin 50 from moving from the released position to the restricted position in a position other than the neutral position are provided as a switching unit from the released state to the restricted state, and as a result, the movement of the pin-side notch 521 from the released position to the restricted position can be reliably restricted in a position other than the neutral position. Thus, it is possible to reliably prevent the relative rotation from being restricted in a position other than the neutral position. More specifically, the relative rotation can only be restricted in the neutral position.

Thus, since the rotation can be reliably restricted in the neutral position even when the above-described steering wheel is removed from the rotary connector device 1, the above-described steering wheel can be reliably assembled to the rotary connector device 1 that is in the neutral position.

In addition, the self-rotation pin 50 can automatically move from the released position to the restricted position in the neutral position, so the self-rotation of the self-rotation pin 50 can be easily restricted. Thus, the relative rotation can be more easily and reliably restricted in the neutral position.

Further, by having the configuration in which, by inserting the above-described steering boss into the rotator-side inner-circumferential cylindrical portion 12, the second spring member 53 can move the self-rotation pin 50 from the restricted position to the released position when in the neutral position, the restricted state in the neutral position can be released by a series of operations to assemble the above-described steering wheel to the rotary connector device 1. Thus, the rotary connector device 1 can be more easily and reliably assembled to the above-described vehicle body in the neutral position.

Further, by using, as a movement restrictor that restricts the movement of the self-rotation pin 50 in the up-down direction, the configuration that is provided with the pin protrusion 52 on the self-rotation pin 50, and the stationary-side switching mechanism 40 in the stator 20, and provided with the rib-side notch 421, on the stationary-side switching mechanism 40, which release the restriction on the self-rotation pin 50 from moving from the released position to the restricted position, the movement restriction on the self-rotation pin 50 can be distributed to the self-rotation pin 50 side and to the stator 20 side, and a load applied to the movement restrictor can thus be reduced. At the same time, since the restriction on the self-rotation pin 50 from moving from the released position to the restricted position can be reliably released in the neutral position, the relative rotation can be restricted by reliably moving the self-rotation pin 50 to the restricted position.

Further, by integrally configuring the pin protrusion 52 and the pin-side notch 521, the number of components is reduced, and the configuration of the rotary connector device 1 can thus be simplified.

Further, when the maximum number of rotations from the neutral position in each of both the rotational directions is defined as a neutral maximum number of rotations, the stationary-side gear 231 and the self-rotation-side gear 511 are configured such that the relative rotation and the self-rotation are transmitted while causing a ratio of the number of relative rotations with respect to the number of self-rotations to be reduced so as to be equal to or greater than the neutral maximum number of rotations. As a result, the pin-side notch 521 can be reliably prevented from coming into contact with the inner circumferential surface of the stator-side inner-circumferential cylindrical portion 23 in a position other than the neutral position.

In more detail, as a result of configuring the stationary-side gear 231 and the self-rotation-side gear 511 such that the relative rotation and the self-rotation are transmitted while causing the ratio of the number of relative rotations with respect to the number of self-rotations to be reduced to be equal to or greater than the neutral maximum number of rotations, even when the relative rotations have rotated by the neutral maximum number of rotations, the number of self-rotations of the self-rotation pin 50 performed as a result of the relative rotations can be caused to be less than one rotation.

More specifically, the pin-side notch 521 can be prevented from coming into contact with the inner circumferential surface of the stator-side inner-circumferential cylindrical portion 23 in a position other than the neutral position during the relative rotations. Thus, it is possible to reliably prevent the relative rotation from being restricted in a position other than the neutral position.

Further, by configuring the stationary-side gear 231 and the self-rotation-side gear 511 such that, within a range of the neutral maximum number of rotations (the maximum number of relative rotations from the neutral position in each of both the rotational directions), a full number (an integral number) of relative rotations are transmitted to the self-rotation pin 50 as the non-integral number of rotations, the pin-side notch 521 can be reliably prevented from coming into contact with the inner circumferential surface of the stator-side inner-circumferential cylindrical portion 23 in a position other than the neutral position.

In more detail, when the self-rotations rotate by the integral number of rotations (e.g. one rotation) in response to the relative rotations rotated by the integral number of rotations (e.g. one rotation) from the neutral position in both the rotational directions, the pin-side notch 521 comes into contact with the inner circumferential surface of the stator-side inner-circumferential cylindrical portion 23. However, since the self-rotations rotate from the neutral position by the non-integral number of rotations in response to the integral number of relative rotations from the neutral position in both the rotational directions, the pin-side notch 521 can be prevented from coming into contact with the inner circumferential surface of the stator-side inner-circumferential cylindrical portion 23 in a position other than the neutral position. It is thus possible to reliably prevent the restricted state from occurring in a position other than the neutral position.

Further, when the non-integral number of rotations is set to be a number greater than one, downsizing of the self-rotation pin 50 can be achieved.

In more detail, in order to keep the number of self-rotations less than one rotation while the relative rotation is rotated by one rotation, as one component that configures the self-rotation pin, a reduction gear that converts the rotational speed of the self-rotation with respect to the relative rotation to a reducible gear ratio, for example, needs to be interposed between the stationary-side gear 231 and the self-rotation-side gear 511. Thus, the size of the self-rotation pin including the reduction gear has to be made larger.

In contrast, when the non-integral number of rotations is set to be a number greater than one, that is, when a configuration is adopted in which the self-rotation pin 50 is rotated by a plurality of rotations while the relative rotation is being performed by one rotation, the reduction gear is not required to be provided separately as one component of the self-rotation pin. In this way, compared with a case in which the number of self-rotations is set to be less than one rotation while the relative rotation is being rotated by one rotation, the self-rotation pin can be downsized. Thus, a space for housing the self-rotation pin 50 can be reduced, and the rotary connector device 1 can also be downsized.

Further, by the self-rotation-side gear 511 provided in the self-rotation pin 50, and the stationary-side gear 231 provided in the stator 20 and engaged with the self-rotation-side gear 511 being provided as a rotation transmitter that transmits the relative rotation and the self-rotation in the interlocked manner, the rotational force of the relative rotation can be reliably transmitted to the self-rotation. Thus, the self-rotation pin 50 can be reliably self-rotated. Thus, the pin-side notch 521 can be reliably prevented from coming into contact with the inner circumferential surface of the stator-side inner-circumferential cylindrical portion 23 in a position other than the neutral position.

In addition, the self-rotation-side gear 511 and the stationary-side gear 231 can be reliably engaged with each other without any gap therebetween, and it is thus possible to prevent the relative rotation from causing idling of the self-rotation. As a result, the rotation can be smoothly transmitted, and the pin-side notch 521 can also be more reliably caused to come into contact with the inner circumferential surface of the stator-side inner-circumferential cylindrical portion 23 in the neutral position, thereby allowing the self-rotation to be reliably restricted.

Thus, the accuracy of the restriction of the relative rotation in the neutral position can be improved. Further, since the configuration can be obtained in which the self-rotation-side gear 511 and the stationary-side gear 231 are reliably engaged with each other, noise can be prevented from being generated at the time of the relative rotation.

Further, by having the configuration in which the pin-side notch 521 comes into contact with the inner circumferential surface of the stator-side inner-circumferential cylindrical portion 23 in the radial direction, the pin-side notch 521 integrally configured with the self-rotation pin 50 can have a simple configuration, and at the same time, can be configured so as to reliably come into contact with the inner circumferential surface of the stator-side inner-circumferential cylindrical portion 23. Thus, the relative rotation can be restricted as a result of restricting the self-rotation.

Further, by the stationary-side switching mechanism 40 and the self-rotation pin 50 being provided on the inner-diameter side of the rotary connector device 1, compared with a case of being provided on the outer-diameter side of the rotary connector device 1, a possibility of the stationary-side switching mechanism 40 or the self-rotation pin 50 interfering with other items and the like can be reduced, for example. Thus, when the rotary connector device 1 is transported, for example, the restricted state can be prevented from being released.

Note that, as described above, although the rotary connector device 1 has the configuration in which the stationary-side switching mechanism 40 is configured by the groove 41 and the rib 42, and the self-rotations of the self-rotation pin 50 are rotated by the non-integral number of rotations when the relative rotations are rotated by the integral number of rotations, the stationary-side switching mechanism 40 may be formed only by the groove 41, and a reduction mechanism may be provided, by which the number of self-rotations of the self-rotation pin 50 is caused to be less than one rotation when the maximum number of relative rotations of 2.5 rotations are rotated from the neutral position in both the rotational directions.

The above-described reduction mechanism may be a teeth number adjusting reduction mechanism that causes the number of teeth of the stationary-side gear to be less than 0.4 times the number of teeth of the self-rotation-side gear 511, or may be a separate gear reduction mechanism that realizes the reduction by using a separate gear provided between the stationary-side gear 231 and the self-rotation-side gear 511.

First, a rotary connector device 1a including the teeth number adjusting reduction mechanism will be briefly described with reference to FIGS. 9A and 9B.

Figure 9A:
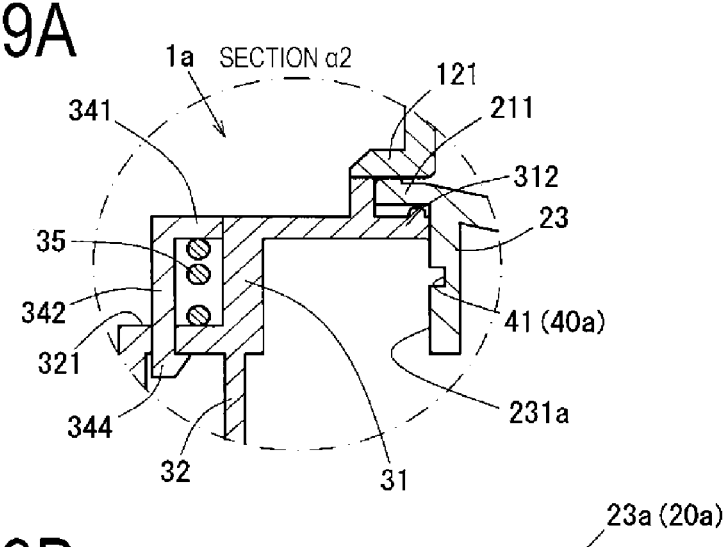
FIGS. 9A and 9B are explanatory diagrams of a rotary connector device of another embodiment.
Figure 9B:
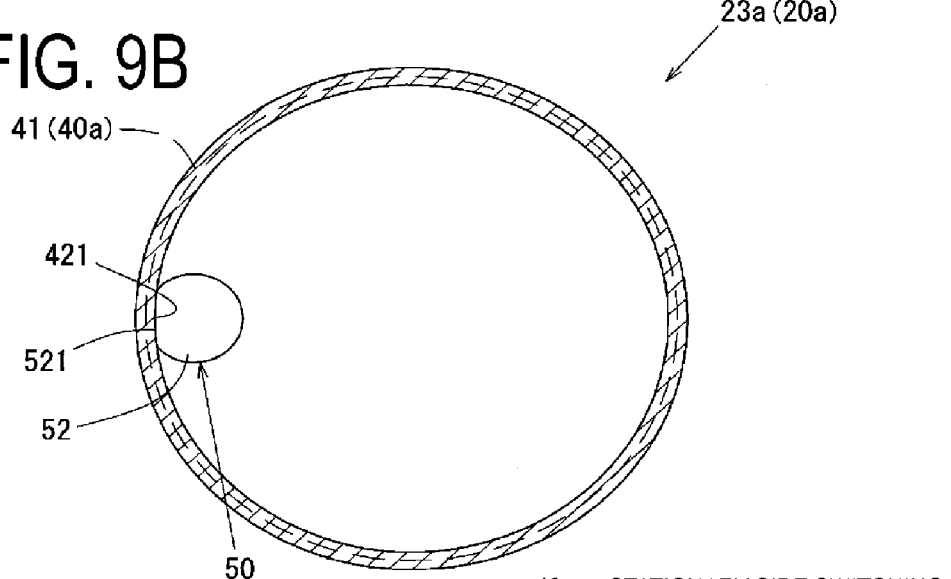

Here, FIGS. 9A and 9B are explanatory diagrams of the rotary connector device 1a of another embodiment. More specifically, FIG. 9A illustrates the section α2 in FIG. 3A of the rotary connector device 1a, and FIG. 9B illustrates a stator-side inner-circumferential cylindrical portion 23a and the self-rotation pin 50 when viewed from above.

In a stator 20a, a stationary-side gear 231, which is configured by five teeth, is provided in the stator-side inner-circumferential cylindrical portion 23a. Of the teeth configuring the stationary-side gear 231a, two adjacent teeth are disposed on both sides of the rib-side notch 421, and the remaining three teeth are disposed at equal intervals (not illustrated).

As illustrated in FIG. 9A and FIG. 9B, a stationary-side switching mechanism 40a is configured only by the groove 41.

In the rotary connector device 1a having the above-described configuration, since the stationary-side gear 231a is configured with the five teeth, which is less than 0.4 times the number of teeth of the self-rotation-side gear 511, even when the relative rotation is performed from the neutral position in both the rotational directions, the number of self-rotations is caused to be less than one rotation. As a result, the rotary connector device 1a can prevent the pin-side notch 521 of the self-rotation pin 50 from being oriented toward the outer-diameter side.

Thus, even when the rotary connector device 1 is provided with the stationary-side switching mechanism 40a that is configured only by the groove 41, it is possible to prevent the restricted state from occurring in the non-neutral state and cause the restricted state to occur only in the neutral position.

Note that the teeth of the stationary-side gear 231 may be disposed at equal intervals, or need not be disposed at equal intervals.

Next, a rotary connector device including the separate gear reduction mechanism will be briefly described.

The separate gear has a configuration in which a stationary-side engagement section thereof that engages with the stationary-side gear 231 and a self-rotation-side engagement section thereof that engages with the self-rotation-side gear 511 are freely rotatable around the same axis in an integrated manner.

In this separate gear, the number of teeth on the stationary-side engagement section is set to be smaller than the number of teeth on the self-rotation-side engagement section, and as long as the number of self-rotations can be reduced to be less than one rotation while the maximum number of relative rotations of 2.5 rotations are rotated from the neutral position in both the rotational directions, either one or a plurality of the separate gears may be used.

As described above, by reducing the number of self-rotations to be less than one rotation even when the relative rotations are rotated from the neutral position in both the rotational directions, the pin-side notch 521 of the self-rotation pin 50 can be prevented from being oriented toward the outer-diameter side. Thus, even when the rotary connector device 1 is provided with the stationary-side switching mechanism 40a that is configured only by the groove 41, it is possible to prevent the restricted state from occurring in the non-neutral state and cause the restricted state to occur only in the neutral position.

With respect to correspondences between the configuration of this invention and the above-described embodiments,
a rotator of this invention corresponds to the rotator 10 and the sleeve 30 of the embodiments,
similarly,
a rotating-side ring plate corresponds to the rotator-side ring plate 11,
an inner-circumferential cylindrical portion corresponds to the rotator-side inner-circumferential cylindrical portion 12,
a stator corresponds to the stators 20 and 20a,
a stationary-side ring plate corresponds to the stator-side ring plate 21;
an outer-circumferential cylindrical portion corresponds to the stator-side outer-circumferential cylindrical portion 22,
the rotation transmitter and a second gear correspond to the stationary-side gears 231 and 231a,
the switching unit, the movement restrictor, and a second restrictor correspond to the stationary-side switching mechanisms 40 and 40a,
a movement restriction release portion corresponds to the rib-side notch 421,
the rotation transmitter and a first gear correspond to the self-rotation-side gear 511,
the switching unit, the movement restrictor, and a first restrictor correspond to the pin protrusion 52,
the rotation restrictor corresponds to the pin-side notch 521, and
the switching unit, a movement unit, and a recovery unit correspond to the second spring member 53. However, this invention is not limited to the configurations of the above-described embodiments, and can take forms of many other embodiments.

For example, in the above description, the self-rotation pin 50 is provided that is held by the pin holder 363 protruding upward from the bottom surface portion 361 and that performs the self-rotation around a rotation axis parallel with a rotation axis of the relative rotation. However, the self-rotation pin 50 may also perform the self-rotation around a self-rotation axis parallel with a direction orthogonal to or a direction intersecting with the rotation axis of the relative rotation.

Further, in the above description, as the rotation transmitter that transmits the rotational force of the self-rotation and the rotational force of the relative rotation to each other, the stationary-side gear 231 and the self-rotation-side gear 511 are used that cause the self-rotation of the self-rotation pin 50 and the relative rotation to be performed in the mutually interlocked manner. However, another member such as a belt may also be used, as long as the self-rotation and the relative rotation can be performed in the interlocked manner, for example.

Further, in the above description, the position from which the relative rotation can be performed 2.5 times in each of both the rotational directions is defined as the neutral position. However, a position from which the relative rotation can be performed a desired number of times, which is set for each of both the rotational directions, may also be defined as the neutral position.

Further, in the above description, the second spring member 53 is used that enables the self-rotation pin 50 to move from the released position to the restricted position. The second spring member 53 need not be configured by a coil spring, and may be configured by an urging member such as a flat spring or rubber, or may be configured so as to be moved manually or moved as a result of coming into contact with another member.

REFERENCE SIGNS LIST 1, 1*a* Rotary connector device
10 Rotator
11 Rotator-side ring plate
12 Rotator-side inner-circumferential cylindrical portion
20, 20*a* Stator
21 Stator-side ring plate
22 Stator-side outer-circumferential cylindrical portion
23 Stator-side inner-circumferential cylindrical portion
231, 231*a* Stationary-side gear
30 Sleeve
40, 40*a* Stationary-side switching mechanism
421 Rib-side notch
50 Self-rotation pin
511 Self-rotation-side gear
52 Pin protrusion
521 Pin-side notch
53 Second spring member

The invention claimed is:

1. A rotary connector device in which a rotator configured by an annular rotator-side ring plate and a cylindrical inner-circumferential portion formed on an inner-circumferential edge of the rotator-side ring plate, and a stator configured by an annular stator-side ring plate and a cylindrical outer-circumferential cylindrical portion formed on an outer-circumferential edge of the stator-side ring plate are fitted with each other to be relatively rotatable in both of rotational directions that are a clockwise direction and a counterclockwise direction, the rotary connector device comprising:
 a self-rotation member provided in at least one of the rotator and the stator to be self-rotatable and provided with a rotation restrictor that restricts the self-rotation as a result of coming into contact with the other one of the rotator and the stator;
 a rotation transmitter that transmits the relative rotation and the self-rotation in an interlockable manner; and
 a switching unit that switches, in a neutral position, a released state, in which restriction of the self-rotation by the rotation restrictor is released, to a restricted state, in which the self-rotation is restricted as a result of contact of the rotation restrictor.

2. The rotary connector device according to claim 1, wherein
 the switching unit is configured by a movement unit that moves, in the neutral position, the rotation restrictor between a restricted position in which the self-rotation is restricted and a released position in which the restriction of the self-rotation is released, and
 a movement restrictor that restricts the movement from the released position to the restricted position in a position other than the neutral position.

3. The rotary connector device according to claim 2, wherein
 the movement unit is configured by a recovery unit that recovers the rotation restrictor from the released position to the restricted position in the neutral position.

4. The rotary connector device according to claim 2, wherein
 the movement unit is configured to be able to move the rotation restrictor in the neutral position between the restricted position and the released position as a result of a steering device being attached to and removed from the inner-circumferential cylindrical portion.

5. The rotary connector device according to claim 3, wherein
 the movement unit is configured to be able to move the rotation restrictor in the neutral position between the restricted position and the released position as a result of a steering device being attached to and removed from the inner-circumferential cylindrical portion.

6. The rotary connector device according to claim 2, wherein
 the movement restrictor is configured by a first restrictor provided in the self-rotation member and a second restrictor provided in the other one of the rotator and the stator, and
 the second restrictor is provided with a movement restriction release portion that releases the restriction on the rotation restrictor from moving from the released position to the restricted position.

7. The rotary connector device according to claim 6, wherein
 the first restrictor and the rotation restrictor are integrally configured.

8. The rotary connector device according to claim 1, wherein
 when a maximum number of rotations from the neutral position in each of both the rotational directions is defined as a neutral maximum number of rotations,
 the rotation transmitter is configured to transmit the self-rotation and the relative rotation while causing a ratio of a number of the self-rotations with respect to a number of the relative rotations to be equal to or greater than the neutral maximum number of rotations.

9. The rotary connector device according to claim 1, wherein
 the rotation transmitter is configured to transmit an integral number of the relative rotations to the self-rotation member as a non-integral number of rotations, within a range of the neutral maximum number of rotations that is the maximum number of the relative rotations from the neutral position in each of both the rotational directions.

10. The rotary connector device according to claim 1, wherein the rotation transmitter is configured by a first gear provided in the self-rotation member, and a second gear provided in the other one of the rotator and the stator to engage with the first gear.

11. The rotary connector device according to claim 8, wherein
the rotation transmitter is configured by a first gear provided in the self-rotation member, and a second gear provided in the other one of the rotator and the stator to engage with the first gear.

12. The rotary connector device according to claim 1, wherein
the rotation restrictor is configured to come into contact with an inner surface of the other one of the rotator and the stator in a radial direction.

13. The rotary connector device according to claim 2, wherein
the rotation restrictor is configured to come into contact with an inner surface of the other one of the rotator and the stator in a radial direction.

14. The rotary connector device according to claim 6, wherein
the rotation restrictor is configured to come into contact with an inner surface of the other one of the rotator and the stator in a radial direction.

* * * * *